W. STRAIT.
TRACTOR BELT MECHANISM.
APPLICATION FILED MAY 24, 1913. RENEWED AUG. 4, 1917.
1,298,597. Patented Mar. 25, 1919.
2 SHEETS—SHEET 1.
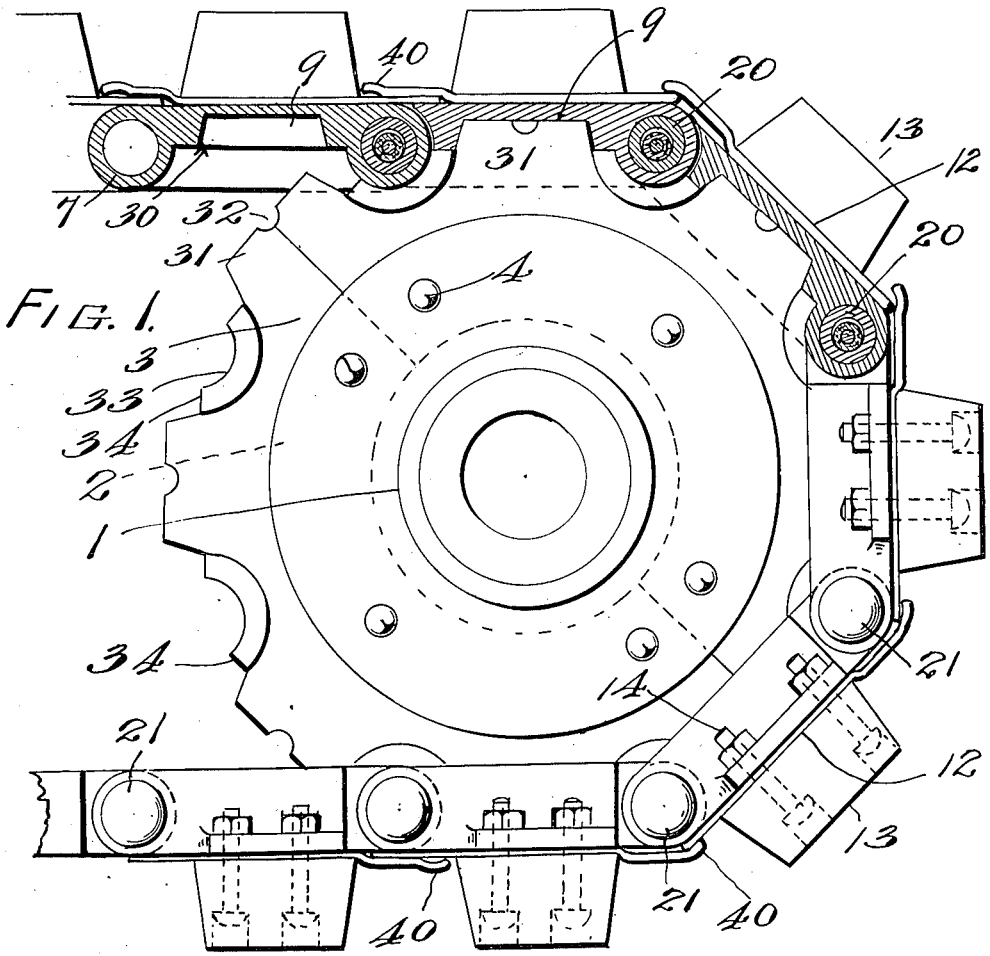
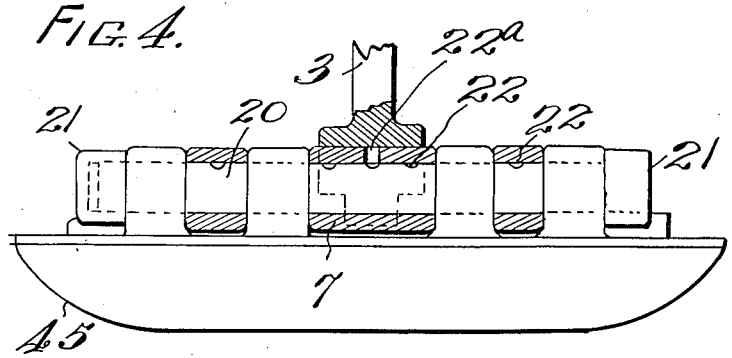
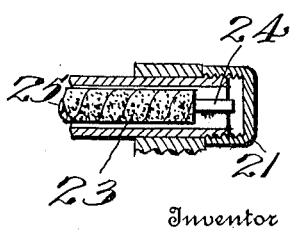

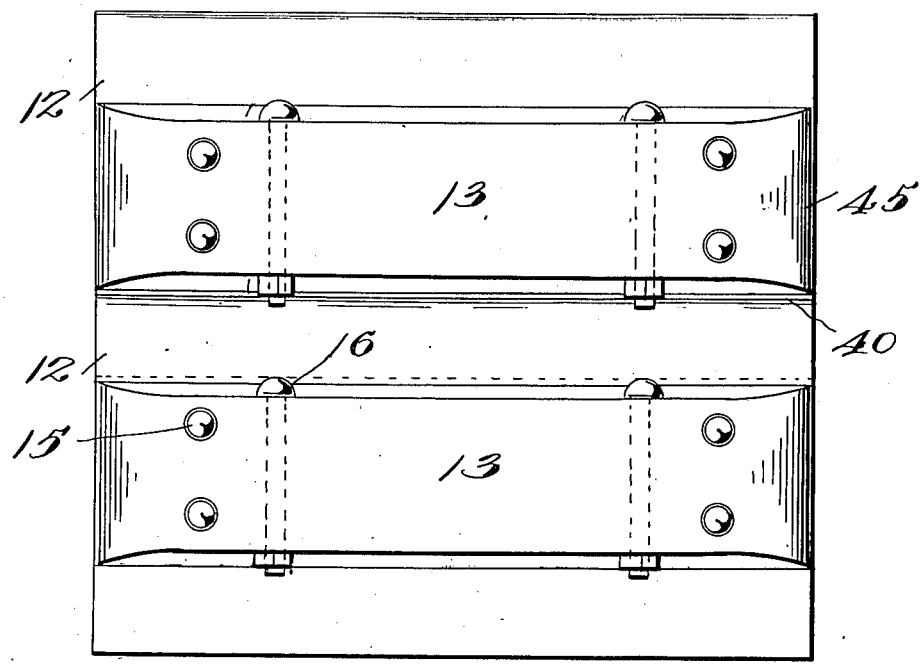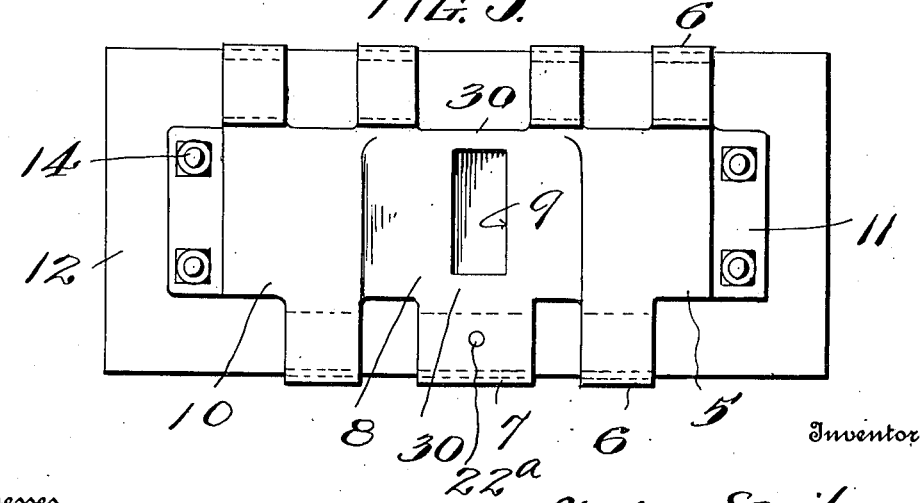

UNITED STATES PATENT OFFICE.

WILLIAM STRAIT, OF APPLETON, WISCONSIN.

TRACTOR-BELT MECHANISM.

1,298,597.　　　　　　　Specification of Letters Patent.　　Patented Mar. 25, 1919.

Application filed May 24, 1913, Serial No. 769,620. Renewed August 4, 1917. Serial No. 184,533.

*To all whom it may concern:*

Be it known that I, WILLIAM STRAIT, a citizen of the United States, residing at Appleton, Wisconsin, have invented certain new and useful Improvements in Tractor-Belt Mechanism, of which the following is a specification.

This invention relates to tractor belts or chains, sprockets and lubricating devices therefor. The accompanying drawing shows one exemplifying embodiment of the invention. It should be understood that structural features may be greatly varied, within the limits of the invention.

Figure 1 is a side view of one end of a tractor chain or belt and its supporting sprocket, certain of the links being shown in section.

Fig. 2 is a bottom plan of two of the links.

Fig. 3 is a top plan of one of the links.

Fig. 4 is a detail of one of the hinge connections showing the lubricator, and

Fig. 5 is a sectional detail of one end of one of the hinges.

Reference character 1 designates a sprocket hub having a flange 2. To this flange the two or more sprocket segments 3 are secured by screws or bolts 4. By making the sprocket in two or more segments it may be easily removed when worn or damaged, without the trouble or expense of dismantling the machine of which the tractor is a part.

The belt or chain consists of separate links, each consisting principally of a body 5. At each side of the body are a plurality of hinge eyes 6. Preferably, the center eye at one side of each link is made relatively wide as at 7, for engagement by the sprocket. The center of each link is provided with a recess 8, and within this recess is a countersink or socket 9 to receive the sprocket tooth. At each side of the recess 8 are flat areas 10, forming, when the chain is assembled, longitudinal tracks to be engaged by rollers or similar devices to maintain the belt in engagement with the ground or to support the free upper side of the belt. Such supporting devices may vary greatly and are not here shown.

At each end of the body 5 is an ear 11. Directly under each body is a guard plate 12 and below this is a tread block 13, usually of wood, or some composition having the necessary qualities of strength and durability for tractor service. Bolts 14 passing through ears 11, plates 12 and blocks 13, secure all of said parts together. The tread blocks are provided with countersinks 15 to receive the bolt heads. The tread blocks may be further strengthened by transverse bolts 16, any desired number of these being used in each block.

The links are connected together by tubular hinge pins 20, passing through the eyes. These pins are secured by end caps 21 and at least one of these caps for each pin is preferably screwed on so that it is easily removable. The pins are perforated as at 22, and within the pins are lubricators 23. Such lubricators may be simply absorbent packing, such as waste, filled with oil, but preferably the lubricators are removable, and in that case, as shown in the drawings, they consist of cores or bodies 24 with a covering 25 of felt or other suitable lubricant carrier. Preferably, the core extends somewhat from the end of the felt as shown, so that when the adjacent cap 21 is removed the lubricator may be easily grasped and pulled out, dipped in a bucket of oil, and replaced, and the cap again screwed on. The hinges of these chains are subject to great strain and wear if not properly lubricated, and the lubricating means just described affords satisfactory lubrication and protection for the joints for a long period of time without renewal, and when renewal is required it may be cheaply and quickly accomplished, as explained.

On each link at each end of the tooth socket 9 is a flat space 30, and when the chain is assembled each of these spaces is immediately adjacent to one of the eyes 7. The sprocket has teeth 31 to engage sockets 9, and the end of each tooth is preferably recessed as at 32, to provide clearance for dirt that may lodge in the sockets. Between each two teeth is a widened bearing segment 33, to fit link eyes 7, and each of these segments terminates in a flat bearing member 34, to engage flat link spaces 30. By the construction just described, the part of the chain lying about the sprocket is very effectively engaged, a sprocket tooth 31 being in each socket 9, a sprocket segment 33 engaging each eye 7, and a sprocket bearing member 34 engaging each flat space 30. A very large wearing surface is thus afforded and the chain will run a long time before wear is appreciable. The chain is also very effectively held on the true pitch line and the strain is largely taken off the pins 20, by the engagement of segments 33 with eyes 7.

Figs. 1 and 2 show that guard plates 12 are provided with overlapping projections 40, and these are arranged to accommodate the bending movement of the links, and at the same time they effectively prevent dirt from reaching the bearings.

A desirable refinement consists in beveling or rounding off the ends of the tread blocks, as at 45. This makes it much easier to turn the tractor, especially when working in soft ground.

By using tubular hinge pins these hinge bearings may be made of large diameter and great wearing capacity without unduly increasing the weight of the belt.

The lubricators 23 may be used to lubricate the bearing surfaces of the sprocket by providing a perforation 22$^a$ in one or more of the eyes 7. Oil will then pass from the lubricator through holes 22 to hole 22$^a$ and thence to the sprocket.

I claim:

1. In tractor belt mechanism, the combination of chain links having interfitting hinge-eyes on their ends, said eyes extending inwardly of the links to form sprocket-engaging members, pins passing through said eyes, the links being provided with substantially central sockets and sprocket-engaging shoulders between said sockets and said eyes, a sprocket having laterally-extending sockets to engage said projections, shoulders to engage the shoulders on the links and teeth to engage the sockets in the links and tread blocks secured to the outer faces of the links.

2. In tractor belt mechanism, the combination of chain links having interfitting hinge-eyes on their ends, said eyes extending inwardly of the links to form part-cylindrical sprocket-engaging members, pins passing through said eyes, the links being provided with substantially central sockets and sprocket-engaging shoulders between said sockets and said eyes, a sprocket having laterally-extending sockets to engage said part-cylindrical projections, shoulders to engage the shoulders on the links, teeth to engage the sockets in the links, tread blocks secured to the outer faces of the links, guard plates secured to the outer faces of the links, each plate extending beyond one end of its link and overlapping, and flexibly engaging the adjacent link so as to prevent passage of dirt in any of the angular positions of the links.

3. In traction belt mechanism, the combination of chain-links having interfitting hinge-eyes adapted to engage the teeth of a sprocket wheel, tread blocks secured to the links, hollow hinge pins passing through the eyes, lubricators within the pins, and detachable caps upon the pins engaging the outermost hinge-eyes to secure the pins and lubricators in position.

WILLIAM STRAIT.

Witnesses:
A. M. PARKINS,
D. M. SMITH.